United States Patent
Baumgart et al.

(10) Patent No.: US 7,153,357 B2
(45) Date of Patent: Dec. 26, 2006

(54) COATING MATERIAL, RELATED PRODUCTION METHOD AND USE

(75) Inventors: Hubert Baumgart, Münster (DE); Simone Jurczik, Senden (DE); Beate Gebauer, Münster (DE)

(73) Assignee: BASF Coatings AG, Munster (DE)

( * ) Notice: Subject to any disclaimer, the term of this patent is extended or adjusted under 35 U.S.C. 154(b) by 33 days.

(21) Appl. No.: 10/518,942

(22) PCT Filed: Jun. 30, 2003

(86) PCT No.: PCT/EP03/06950

§ 371 (c)(1),
(2), (4) Date: Dec. 16, 2004

(87) PCT Pub. No.: WO2004/018578

PCT Pub. Date: Mar. 4, 2004

(65) Prior Publication Data

US 2005/0223945 A1    Oct. 13, 2005

(30) Foreign Application Priority Data

Jul. 31, 2002   (DE) ............................... 102 36 146

(51) Int. Cl.
C04B 14/04     (2006.01)
C01B 33/12     (2006.01)

(52) U.S. Cl. ..................................... 106/481; 423/335

(58) Field of Classification Search ................ 106/481; 423/335

See application file for complete search history.

(56) References Cited

U.S. PATENT DOCUMENTS

| | | | |
|---|---|---|---|
| 3,580,519 A * | 5/1971 | Klein et al. ................... 241/22 |
| 4,614,683 A | 9/1986 | Barsotti ...................... 428/220 |
| 5,663,244 A | 9/1997 | Barancyk et al. ........... 525/456 |
| 5,798,145 A | 8/1998 | Barancyk et al. ......... 427/393.5 |
| 5,976,701 A | 11/1999 | Barancyk et al. ......... 428/423.1 |
| 6,451,437 B1 * | 9/2002 | Amidaiji et al. ............ 428/447 |
| 6,478,864 B1 * | 11/2002 | Field ..................... 106/169.17 |
| 6,808,715 B1 * | 10/2004 | Ingman ..................... 424/400 |

FOREIGN PATENT DOCUMENTS

| EP | 0 076 377 | 8/1982 |
|---|---|---|
| EP | 1 092 758 | 10/2000 |
| JP | 6184493 | 7/1994 |
| JP | 2000104047 | 4/2000 |

* cited by examiner

Primary Examiner—J. A. Lorengo
Assistant Examiner—Patricia L. Hailey

(57) ABSTRACT

A coating material comprising
(A) at least one kind of hydrophobic nanoparticles based on silica and
(B) at least one kind of hydrophilic nanoparticles based on silica having a BET internal surface area of >300 $m^2/g$;
process for preparing it, and its use.

15 Claims, No Drawings

COATING MATERIAL, RELATED PRODUCTION METHOD AND USE

This application is a National Phase Application of Patent Application PCT/EP2003/006950 filed on 30 Jun. 2003, which claims priority to DE 102 36 146.0 filed on 31 Jul. 2002.

FIELD OF THE INVENTION

The present invention relates to a novel coating material. The present invention further relates to a process for preparing the novel coating material. The present invention additionally relates to the use of the novel coating material for producing coatings, especially paint systems.

PRIOR ART

The use of hydrophilic or hydrophobic nanoparticles based on pyrogenic silica in coating materials is known.

Here and below, the property of being "hydrophilic" refers to the constitutional property of a molecule or functional group to penetrate the aqueous phase or to remain therein. Accordingly, the property of being "hydrophobic" refers to the constitutional property of a molecule or functional group to behave exophilically with respect to water, i.e., to tend not to penetrate into water, or to depart the aqueous phase. For further details refer to Römpp Lexikon Lacke und Druckfarben, Georg Thieme Verlag, Stuttgart, New York, 1998, "hydrophilicity", "hydrophobicity", pages 294 and 295.

The nanoparticles are added to the coating materials for various purposes. In aqueous basecoat films they may prevent strike-in when clearcoat materials are applied, in accordance with the wet-on-wet technique. In conventional coating materials, i.e., those containing organic solvents, they may be used as rheological aids and may reduce the propensity of the coating materials to run. Moreover, they may enhance the scratch resistance of the coatings produced from the coating materials in question.

For example, German patent application DE 199 24 172 A1 diskloses the use of hydrophobic nanoparticles based on silica or of hydrophilic nanoparticles based on silica. The use of mixtures of hydrophobic nanoparticles and hydrophilic nanoparticles is not taught.

Set against all of the advantages of the use of hydrophilic and hydrophobic nanoparticles based on silica in coating materials are the considerable problems it poses in the case of transparent coating materials or clearcoat materials which serve in particular for producing clear, transparent, scratch-resistant clearcoats.

When the hydrophobic nanoparticles are used in the clearcoat materials in amounts which produce good scratch resistance, the clearcoats in question are indeed scratch-resistant but also matt and of a comparatively unsatisfactory evenness. While the use of hydrophilic nanoparticles in contrast improves the clarity, transparency, and evenness of the clearcoats in question, it is unable to produce a significant improvement in their scratch resistance.

THE PROBLEM OF THE INVENTION

It is an object of the present invention to provide a novel coating material which no longer has the disadvantages of the prior art, which can be produced simply and very reproducibly, and which provides coatings, especially clearcoats, which are scratch-resistant, clear, transparent, highly glossy, and brilliant, and which have very good evenness and a very good surface smoothness.

THE SOLUTION AFFORDED BY THE INVENTION

The invention accordingly provides the novel coating material comprising
(A) at least one kind of hydrophobic nanoparticles based on silica and
(B) at least one kind of hydrophilic nanoparticles based on silica having a BET internal surface area of >300 m$^2$/g, referred to below as "coating material of the invention".

Further subject matter of the invention will emerge from the description.

THE ADVANTAGES OF THE SOLUTION AFFORDED BY THE INVENTION

In the light of the prior art it was surprising and unforeseeable for the skilled worker that despite the use of hydrophilic nanoparticles (B) it was also possible to prepare conventional coating materials of the invention simply and with reliable reproducibility.

It was also surprising that the coating materials of the invention were stable on storage and had very good application characteristics. In particular, following their application, they no longer showed any tendency toward running on vertical surfaces.

Even more surprising was that the coating materials of the invention free from hiding pigments gave highly glossy, brilliant, smooth, clear, transparent, scratch-resistant coatings, especially clearcoats, which were free from surface defects. These particular advantages occurred surprisingly even in the case of clearcoats with a thickness >50 µm.

Consequently, the coating materials of the invention and the coatings of the invention produced from them were surprisingly of broad usefulness. They were outstandingly suitable in particular for producing moldings, especially optical moldings, and films and for coating or painting motor vehicle bodies and parts thereof, the interior and exterior of motor vehicles, the inside and outside of buildings, doors, windows, and furniture, and, in the context of industrial coating, for coating plastics parts, especially transparent plastics parts, small parts, coils, containers, packaging, electrical components, and white goods, and also for coating hollow glassware.

DETAILED DESCRIPTION OF THE INVENTION

The essential constituents of the coating material of the invention are
(A) at least one, especially one, kind of hydrophobic nanoparticles based on silica and
(B) at least one, especially one, kind of hydrophilic nanoparticles based on silica having a BET internal surface area of >300, preferably >340, and in particular >350 m$^2$/g.

The weight ratio of hydrophobic nanoparticles (A) to hydrophilic nanoparticles (B) may vary very widely and is guided by the requirements of the case in hand. The (A):(B) weight ratio is preferably from 1:4 to 4:1, more preferably from 3:7 to 7:3, and in particular from 2:3 to 3:2.

The amount of the hydrophobic nanoparticles (A) and hydrophilic nanoparticles (B) in the coating materials may likewise vary very widely and is guided by the requirements of the case in hand: for example, by the level of scratch resistance to be established. The amount is preferably from 0.3 to 6%, more preferably from 0.6 to 4%, with particular preference from 0.8 to 3%, and in particular from 1 to 2.4% by weight, based in each case on the overall solids content of the coating material of the invention.

The primary particle size of the nanoparticles (A) and (B) is preferably <35, more preferably <20, and in particular <10 nm.

The silica which forms the basis of the nanoparticles (A) and (B) may be silica prepared by any of the wide variety of customary processes. It is preferably pyrogenic silica. The agglomerates and aggregates of its primary particles have a catenated structure and are produced by flame hydrolysis of silicon tetrachloride in an oxyhydrogen flame.

The silica, especially the pyrogenic silica, is hydrophilic per se and may be used without further surface modification as hydrophilic nanoparticles (B); in other words, said nanoparticles (B) are preferably composed of pyrogenic silica.

The hydrophobic nanoparticles (A) are preferably prepared by modifying the surface of pyrogenic silica with compounds containing hydrophobic groups.

Suitable hydrophobic nanoparticles (A) include preferably inorganic nanoparticles which carry hydrophobic groups on their surface. Examples of suitable hydrophobic nanoparticles (A) are reaction products of hydrophilic nanoparticles, such as particularly those described later on below as nanoparticles (B), with compounds having hydrophobic groups, especially with organofunctional silicon compounds (I) having at least one functional group (Ia) which is reactive toward the hydrophilic groups of the nanoparticles (B) and having at least one hydrophobic radical (Ib). The compounds (I) preferably have no further groups which are reactive toward the other constituents of the coating composition, especially no further groups reactive toward the binders and/or crosslinkers.

As compounds (I) it is particularly preferred to use organofunctional silicon compounds having at least one alkyl group having from 1 to 50 carbon atoms, in particular having from 1 to 10 carbon atoms, and having at least one hydrolyzable group and/or at least one OH and/or NH group. Examples of compounds (I) are alkylalkoxysilanes, especially dialkyldialkoxysilanes and alkyltrialkoxysilanes, alkylhalosilanes, especially alkylchlorosilanes, preferably trialkylchlorosilanes and dialkyldichlorosilanes, alkylpolysiloxanes, dialkylpolysiloxanes, and alkyldisilazanes and the like. Also suitable as compound (I) are various monomeric and/or oligomeric silicic esters which have methoxy, ethoxy or n-propoxy and/or isopropoxy groups and have a degree of oligomerization of from 1 to 50, in particular from 2 to 10, with particular preference from 3 to 5.

Further examples of suitable organofunctional compounds (I) are the organofunctional silicon compounds described in DE-A-100 49 628.

Additional examples of suitable compounds (I) are the known, commercially available products sold, for example, by Hüls under the brand name DYNASILAN®.

As compounds (I) it is particularly preferred to use dimethyldichlorosilane and/or hexamethyldisilazane and/or octyltrimethoxysilane and/or dimethylpolysiloxane.

Very particularly preferred hydrophobic nanoparticles (A) used are nanoparticles based on the reaction products of $SiO_2$ and dimethyldichlorosilane and/or hexamethyldisilazane, especially reaction products of $SiO_2$ and dimethyldichlorosilane.

Examples of hydrophobic nanoparticles (A) which can be used are customary products as sold, for example, by Degussa under the brand name Aerosil®, especially Aerosil® 8200, R106, R972, R974, R805 or R812, or by Wacker under the brand name or type designation HDK, especially HDK H 15, H 18, H 20, H 30 or 2000.

For silicas which can be used, refer for example to the brochure "Pyrogene Kieselsäuren-Aerosil®" from Sivento, Degussa-Hüls AG.

Suitable hydrophilic nanoparticles (B) are preferably inorganic nanoparticles carrying hydrophilic groups on their surface. Examples of suitable inorganic hydrophilic nanoparticles (B) are nanoparticles based on the oxides and/or mixed oxides, including the oxide hydrates of at least one metal or semimetal from main groups two to six and transition groups one to eight of the Periodic System of the Elements or from the lanthanides, especially oxides and/or mixed oxides, including oxide hydrates, from the group of elements Si, Al, Ti, Zr and/or Ce. Examples thereof are nanoparticles based on $SiO_2$, such as pyrogenically prepared silica, silicates, $Al_2O_3$, aluminum hydroxide, aluminosilicates, $TiO_2$, titanates, $ZrO_2$ or zirconates, $CeO_2$, especially nanoparticles based on pyrogenic silica. Particularly preferred hydrophilic nanoparticles (B) used are inorganic nanoparticles which have not been surface modified by reaction with different organic compounds; with very particular preference, unmodified pyrogenic silica.

Examples of suitable hydrophilic nanoparticles (B) are also the commercially available, customary products based on $SiO_2$, sold for example by Degussa under the brand name Aerosil® R 380 or by Wacker under the type designation T 40.

The coating materials of the invention may be liquid or solid.

The liquid coating materials of the invention may be conventional coating materials or substantially or entirely water-free and solvent-free coating materials (100% systems). The solid coating materials of the invention may be powder coating materials.

The coating materials of the invention may be curable physically, thermally, with actinic radiation, or both thermally and with actinic radiation. Here and below, actinic radiation means electromagnetic radiation, such as near infrared (NIR), visible light, UV radiation or X-rays, especially UV radiation, and corpuscular radiation, such as electron beams. Joint curing with thermal energy and actinic radiation is also referred to as dual cure.

The thermally curable coating materials of the invention and the dual-cure coating materials of the invention may be self-crosslinking and/or externally crosslinking. They may be one-component systems, in which all of the constituents are present alongside one another. They may alternatively be two-component or multicomponent systems, especially two-component systems, in which owing to their high reactivity the crosslinking agents are stored separately from their co-constituents until the coating materials of the invention are applied and are not mixed with them until shortly before application.

The coating materials of the invention may be pigmented or unpigmented.

The pigmented coating materials of the invention preferably comprise at least one pigment selected from the group consisting of color pigments, optical effect pigments, electrically conductive pigments, magnetic pigments, magnetically shielding pigments, fluorescent pigments, phosphorescent pigments, anticorrosion pigments, and extender pigments, and also pigments combining at least two of these properties. Preference is given to using the color and/or effect pigments.

Preference is given to using the liquid coating materials of the invention, with particular preference to the conventional coating materials of the invention, with very particular preference to the pigment-free conventional coating materials of the invention, and in particular the pigment-free, conventional, thermally curable or dual-cure coating materials of the invention.

The coating materials of the invention may consequently be used for any of a wide variety of purposes, particularly as surfacers or antistonechip primers, basecoat materials, solid-color topcoat materials or clearcoat materials, especially as clearcoat materials.

The conventional one-component clearcoat materials of the invention comprise, as is known, hydroxyl-containing binders and crosslinking agents, such as blocked polyisocyanates, tris(alkoxycarbonylamino)triazines and/or amino resins (cf. German patent application DE 199 24 172 A1 or DE 199 24 171 A1). In another variant they comprise as binders polymers containing pendant carbamate and/or allophanate groups and, where appropriate, carbamate- and/or allophanate-modified amino resin crosslinking agents (cf. American patent U.S. Pat. No. 5,474,811 A1, U.S. Pat. No. 5,356,669 A1 or U.S. Pat. No. 5,605,965 A1, international patent application WO 94/10211, WO 94/10212 or WO 94/10213 or European patent application EP 0 594 068 A1, EP 0 594 071 A1 or EP 0 594 142 A1).

The essential constituents of the two-component clearcoat materials of the invention, especially the conventional ones, are known to be hydroxyl-containing binders and polyisocyanate crosslinking agents, which are stored separately until they are used (cf. German patent application DE 199 24 172 A1 or DE 199 24 171 A1).

The dual-cure clearcoat materials of the invention are preferably conventional one-component or two-component clearcoat materials which further include functional groups which can be activated with actinic radiation and/or include additional constituents containing such functional groups. Particular preference is given to using acrylate groups as functional groups which can be activated with actinic radiation. Examples of suitable additional constituents are isocyanato acrylates, urethane acrylates or polyfunctional acrylates, such as dipentaerythritol pentaacrylate (cf. patent application EP 0 982 800 A1, EP 0 844 286 A1, WO 98/40170 and DE 199 14 896 A1).

Preference is given to using coating compositions based on hydroxyl-containing binders, especially polyacrylate resins and hydroxyl-reactive crosslinkers, particularly isocyanato-containing crosslinkers and/or tris(alkoxycarbonylamino)triazines and/or amino resins. The OH number of suitable binders may be generally from 15 to 300, preferably from 30 to 250, with particular preference from 50 to 200, with very particular preference from 70 to 180, and in particular from 80 to 170.

Described below is a preferred coating system of the invention:

It is preferred to use polyacrylate resin binders. In the case of polyacrylate resins for nonaqueous coating materials, the binder may in particular be a polyacrylate resin which can be prepared by polymerizing (a) from 16 to 51% by weight, preferably from 16 to 28% by weight, of a hydroxyl-containing ester of acrylic acid or methacrylic acid or a mixture of such monomers, (b) from 32 to 84% by weight, preferably from 32 to 63% by weight, of a non-(a) aliphatic or cycloaliphatic ester of acrylic acid or methacrylic acid having preferably at least 4 carbon atoms in the alcohol residue, or a mixture of such monomers, (c) from 0 to 2% by weight, preferably from 0 to 1% by weight, of an ethylenically unsaturated carboxylic acid or a mixture of ethylenically unsaturated carboxylic acids, and (d) from 0 to 30% by weight, preferably from 0 to 20% by weight, of a non-(a), -(b), and -(c) ethylenically unsaturated monomer, or a mixture of such monomers, to give a polyacrylate resin having an acid number of from 0 to 25, preferably from 0 to 8, a hydroxyl number of from 80 to 200, preferably from 80 to 120, and a number-average molecular weight of from 1 500 to 10 000, preferably from 2 000 to 5 000, the sum of the weight fractions of components (a), (b), (c), and (d) always making 100% by weight.

The polyacrylate resins which are used with preference can be prepared by conventional polymerization techniques in bulk, solution or emulsion. Polymerization techniques for preparing polyacrylate resins are common knowledge and have been widely described (cf. e.g.: Houben Weyl, Methoden der organischen Chemie, 4th edition, volume 14/1, pages 24 to 255 (1961)).

Further examples of suitable (co)polymerization techniques for preparing the polyacrylate resins are described in patent DE-A-197 09 465, DE-C-197 09 476, DE-A-28 48 906, DE-A-195 24 182, EP-A-0 554 783, WO 95/27742, DE-A-38 41 540 or WO 82/02387.

Taylor reactors are advantageous, particularly for copolymerization in bulk, solution or emulsion.

The technique used to prepare the polyacrylate resins used is preferably that of solution polymerization. In this technique, normally, an organic solvent or solvent mixture is introduced and is heated to boiling. The monomer mixture to be polymerized, along with one or more polymerization initiators, is then added continuously to said organic solvent or solvent mixture. Polymerization takes place at temperatures between 100 and 160° C., preferably between 130 and 150° C. Polymerization initiators used are preferably free-radical initiators. The type and amount of initiator are commonly chosen so as to give a very largely constant supply of free radicals during the feed phase at the polymerization temperature.

Examples of initiators that may be used include the following: dialkyl peroxides, such as di-tert-butyl peroxide or dicumyl peroxide; hydroperoxides, such as cumene hydroperoxide or tert-butyl hydroperoxide; peresters, such as tert-butyl perbenzoate, tert-butyl perpivalate, tert-butyl per-3,5,5-trimethylhexanoate or tert-butyl per-2-ethylhexanoate; azo dinitriles such as azobisisobutyronitrile or C—C-cleaving initiators such as benzpinacol silyl ethers.

The polymerization conditions (reaction temperature, feed time of the monomer mixture, nature and amount of the organic solvents and polymerization initiators, possible use of molecular weight regulators, e.g., mercaptans, thioglycolates, and hydrogen chlorides) are selected so that the polyacrylate resins used have a number-average molecular weight from 1 500 to 10 000, preferably from 2 000 to 5 000 (determined by gel permeation chromatography using polystyrene as calibrating substance).

The acid number of the polyacrylate resins used in accordance with the invention may be adjusted by the skilled worker by using appropriate amounts of component (c). Similar comments apply to the adjustment of the hydroxyl number. It can be controlled by way of the amount of component (a) used.

As component (a) it is possible in principle to use any hydroxyl-containing ester of acrylic acid or methacrylic acid or a mixture of such monomers. Examples include the following: hydroxyalkyl esters of acrylic acid, such as hydroxyethyl acrylate, hydroxypropyl acrylate, hydroxybutyl acrylate, especially 4-hydroxybutyl acrylate; hydroxyalkyl esters of methacrylic acid, such as hydroxyethyl methacrylate, hydroxypropyl methacrylate, hydroxybutyl methacrylate, especially 4-hydroxybutyl methacrylate; reaction products of cyclic esters, such as ε-caprolactone, for example, and hydroxyalkyl esters of acrylic and/or methacrylic acid.

The composition of component (a) is preferably selected such that polymerization of component (a) alone gives a polyacrylate resin having a glass transition temperature of from −50 to +70° C., preferably from −30 to +50° C. The glass transition temperature may be calculated approximately by the skilled worker with the aid of the formula $$1/T_g = \sum_{n=1}^{n=x} W_n / T_{gn}$$

$T_g$ = glass transition temperature of the polymer $x$ = number of different copolymerized monomers $W_n$ = weight fraction of the $n$th monomer $T_{gn}$ = glass transition temperature of the homopolymer of the $n$th monomer.

As component (b) it is possible in principle to use any non-(a) aliphatic or cycloaliphatic ester of acrylic or methacrylic acid having at least 4 carbon atoms in the alcohol residue, or a mixture of such monomers. Examples include the following: aliphatic esters of acrylic and methacrylic acid having from 4 to 20 carbon atoms in the alcohol residue, such as n-butyl, isobutyl, tert-butyl, 2-ethylhexyl, stearyl and lauryl acrylate and methacrylate, and also cycloaliphatic esters of acrylic acid and methacrylic acid, such as cyclohexyl acrylate and cyclohexyl methacrylate, for example. The composition of component (b) is preferably selected so that polymerization of component (b) alone gives a polyacrylate resin having a glass transition temperature of from 10 to 100° C., preferably from 20 to 60° C.

As component (c) it is possible in principle to use any ethylenically unsaturated carboxylic acid or a mixture of ethylenically unsaturated carboxylic acids. As component (c) it is preferred to use acrylic acid and/or methacrylic acid.

As component (d) it is possible in principle to use any non-(a), -(b), and -(c) ethylenically unsaturated monomer or a mixture of such monomers. Examples of monomers which can be used as component (d) include the following: vinylaromatic hydrocarbons, such as styrene, alpha-alkylstyrene, and vinyltoluene, amides of acrylic acid and methacrylic acid, such as methacrylamide and acrylamide, nitrites of methacrylic acid and acrylic acid; vinyl ethers and vinyl esters or polysiloxane macromonomers, as described in patent DE-A-38 07 571, DE-A-37 06 095, EP-B-0 358 153, U.S. Pat. No. 4,754,014, DE-A-44 21 823 or WO 92/22615. As component (d) it is preferred to use vinylaromatic hydrocarbons, especially styrene. The composition of component (d) is preferably selected so that polymerization of component (d) alone gives a resin having a glass transition temperature of from 70 to 120° C., preferably from 80 to 100° C.

In the coating material the binders are present advantageously in an amount of from 10 to 90% by weight, with particular preference from 15 to 80% by weight, and in particular from 20 to 70% by weight, based on each case on the overall solids content of the coating material.

Where the coating material is a multicomponent system, polyisocyanates and/or polyepoxides, but especially polyisocyanates, are used as crosslinking agents.

Examples of suitable polyisocyanates are organic polyisocyanates, especially what are known as paint polyisocyanates, containing aliphatically, cyclo-aliphatically, araliphatically and/or aromatically bonded free isocyanate groups. Preference is given to using polyisocyanates having from 2 to 5 isocyanate groups per molecule and having viscosities of from 100 to 10 000, preferably from 100 to 5 000 and in particular from 100 to 2 000 mPas (at 23° C.). Where appropriate, small amounts of organic solvent, preferably from 1 to 25% by weight based on straight polyisocyanate, may be added to the polyisocyanates in order to improve the ease of incorporation of the isocyanate and, where appropriate, to lower the viscosity of the polyisocyanate to a level within the aforementioned ranges. Examples of suitable solvent additives to the polyisocyanates include ethoxyethyl propionate, amyl methyl ketone, and butyl acetate. Moreover, the polyisocyanates may have been given a conventional hydrophilic or hydrophobic modification.

Examples of suitable polyisocyanates are described, for example, in "Methoden der organischen Chemie", Houben-Weyl, volume 14/2, 4th edition, Georg Thieme Verlag, Stuttgart 1963, pages 61 to 70, and by W. Siefken, Liebigs Annalen der Chemie, volume 562, pages 75 to 136. Also suitable, for example, are the isocyanato-containing polyurethane prepolymers which can be prepared by reacting polyols with an excess of polyisocyanates and which are preferably of low viscosity.

Further examples of suitable polyisocyanates are polyisocyanates containing isocyanurate, biuret, allophanate, iminooxadiazinedione, urethane, urea and/or uretdione groups. Polyisocyanates containing urethane groups, for example, are obtained by reacting some of the isocyanate groups with polyols, such as trimethylolpropane and glycerol, for example. Preference is given to using aliphatic or cycloaliphatic polyisocyanates, especially hexamethylene diisocyanate, dimerized and trimerized hexamethylene diisocyanate, isophorone diisocyanate, 2-isocyanatopropylcyclohexyl isocyanate, dicyclohexylmethane 2,4'-diisocyanate, dicyclohexylmethane 4,4'-diisocyanate or 1,3-bis(isocyanatomethyl)cyclohexane, diisocyanates derived from dimer fatty acids, as sold under the commercial designation DDI 1410 by Henkel, 1,8-diisocyanato-4-isocyanatomethyloctane, 1,7-diisocyanato-4-isocyanatomethylheptane or 1-isocyanato-2-(3-isocyanatopropyl)cyclohexane or mixtures of these polyisocyanates.

Examples of suitable polyepoxides are all known aliphatic and/or cycloaliphatic and/or aromatic polyepoxides, based for example on bisphenol A or bisphenol F. Examples of further suitable polyepoxides include those available commercially under the designations Epikote® from Shell, Denacol® from Nagase Chemicals Ltd., Japan, such as Denacol EX-411 (pentaerythritol polyglycidyl ether), Denacol EX-321 (trimethylolpropane polyglycidyl ether), Denacol EX-512 (polyglycerol polyglycidyl ether) and Denacol EX-521 (polyglycerol polyglycidyl ether).

In the case of the one-component systems, crosslinking agents are used which react at relatively high temperatures with the functional groups of the binders in order to build up a three-dimensional network. Of course, such crosslinking agents may be used as well in minor amounts in the multicomponent systems. In the context of the present invention, "minor amount" means a fraction which does not disrupt, let alone prevent entirely, the main crosslinking reaction.

Examples of suitable crosslinking agents of this kind are blocked polyisocyanates. Examples of suitable polyisocyanates are those described above.

Examples of suitable blocking agents are the blocking agents known from the U.S. Pat. No. 4,444,954, such as i) phenols such as phenol, cresol, xylenol, nitrophenol, chlorophenol, ethylphenol, t-butylphenol, hydroxybenzoic acid, esters of this acid or 2,5-di-tert-butyl-4-hydroxytoluene;

ii) lactams, such as ε-caprolactam, δ-valerolactam, γ-butyrolactam or β-propiolactam;

iii) active methylenic compounds, such as diethyl malonate, dimethyl malonate, ethyl or methyl acetoacetate or acetylacetone;

iv) alcohols such as methanol, ethanol, n-propanol, isopropanol, n-butanol, isobutanol, t-butanol, n-amyl alcohol, t-amyl alcohol, lauryl alcohol, ethylene glycol monomethyl ether, ethylene glycol monoethyl ether, ethylene glycol monobutyl ether, diethylene glycol monomethyl ether, diethylene glycol monoethyl ether, propylene glycol monomethyl ether, methoxymethanol, glycolic acid, glycolic esters, lactic acid, lactic esters, methylolurea, methylolmelamine, diacetone alcohol, ethylenechlorohydrin, ethylenebromohydrin, 1,3-dichloro-2-propanol, 1,4-cyclohexyldimethanol or acetocyanohydrin;

v) mercaptans such as butyl mercaptan, hexyl mercaptan, t-butyl mercaptan, t-dodecyl mercaptan, 2-mercaptobenzothiazole, thiophenol, methylthiophenol or ethylthiophenol;

vi) Acid amides such as acetoanilide, acetoanisidinamide, acrylamide, methacrylamide, acetamide, stearamide or benzamide;

vii) imides such as succinimide, phthalimide or maleimide;

viii) amines such as diphenylamine, phenylnaphthylamine, xylidine, N-phenylxylidine, carbazole, aniline, naphthylamine, butylamine, dibutylamine or butylphenylamine;

ix) imidazoles such as imidazole or 2-ethylimidazole;

x) ureas such as urea, thiourea, ethyleneurea, ethylenethiourea or 1,3-diphenylurea;

xi) carbamates such as phenyl N-phenylcarbamate or 2-oxazolidone;

xii) imines such ethyleneimine;

xiii) oximes such as acetone oxime, formaldoxime, acetaldoxime, acetoxime, methyl ethyl ketoxime, diisobutyl ketoxime, diacetyl monoxime, benzophenone oxime or chlorohexanone oximes;

xiv) salts of sulfurous acid such as sodium bisulfite or potassium bisulfite;

xv) hydroxamic esters such as benzyl methacrylohydroxamate (BMH) or allyl methacrylohydroxamate; or xvi) substituted pyrazoles, ketoximes, imidazoles or triazoles; and also mixtures of these blocking agents, especially dimethylpyrazole and triazoles, malonates and acetoacetates or dimethylpyrazole and succinimide.

As crosslinking agent it is also possible to use tris (alkoxycarbonylamino)triazines of the general formula

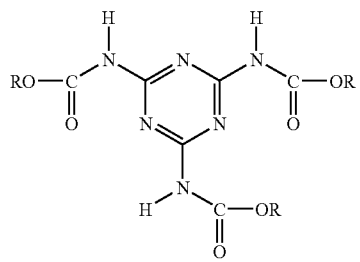

Examples of suitable tris (alkoxycarbonylamino) triazines are described in patent U.S. Pat. No. 4,939,213, U.S. Pat. No. 5,084,541 or EP-A-0 624 577. Use is made in particular of the tris(methoxy-, tris(butoxy- and/or tris(2-ethylhexoxycarbonylamino)triazines.

Of advantage are the methyl butyl mixed esters, the butyl 2-ethylhexyl mixed esters, and the butyl esters. These have the advantage over the straight methyl ester of better solubility in polymer melts and also show less of a tendency to crystallize.

As crosslinking agent it is possible in particular to use amino resins, examples being melamine resins. In this context it is possible to use any amino resin suitable for transparent topcoat materials or clearcoat materials, or a mixture of such amino resins. Particularly suitable are the customary and known amino resins some of whose methylol and/or methoxymethyl groups have been defunctionalized by means of carbamate or allophanate groups. Crosslinking agents of this kind are described in patents U.S. Pat. No. 4 710 542 and EP-B-0 245 700 and also in the article by B. Singh and co-workers, "Carbamylmethylated Melamines, Novel Crosslinkers for the Coatings Industry" in Advanced Organic Coatings Science and Technology Series, 1991, volume 13, pages 193 to 207.

Further examples of suitable crosslinking agents are beta-hydroxyalkylamides such as N,N,N',N'-tetrakis(2-hydroxyethyl)adipamide or N,N,N',N'-tetrakis(2-hydroxypropyl)adipamide.

Further examples of suitable crosslinking agents are siloxanes, especially siloxanes containing at least one trialkoxysilane or dialkoxysilane group.

Further examples of suitable crosslinking agents are polyanhydrides, especially polysuccinic anhydride.

The amount of the crosslinking agents in the coating material may vary widely and is guided in particular on the one hand by the functionality of the crosslinking agents and on the other by the number of crosslinking functional groups present in the binder and also by the crosslinking density which it is intended to achieve. The skilled worker is therefore able to determine the amount of the crosslinking agents on the basis of his or her general art knowledge, where appropriate with the assistance of simple rangefinding tests. Advantageously, the crosslinking agent is present in the coating material in an amount of from 5 to 60% by weight, with particular preference from 10 to 50% by weight, and in particular from 15 to 45% by weight, based in each case on the overall solids content of the coating material. In this context it is further advisable to select the amounts of crosslinking agent and binder such that in the coating material the ratio of functional groups in the crosslinking agent to functional groups in the binder is from 2:1 to 1:2, preferably from 1.5:1 to 1:1.5, with particular preference from 1.2:1 to 1:1.2, and in particular from 1.1:1 to 1:1.1.

The coating material is preferably a nonaqueous coating material, more preferably a nonaqueous transparent gloss clearcoat material. The term gloss clearcoat material means that a very high gloss is desired, in contrast to the matt paints.

In the case of nonaqueous coating materials they contain from 20 to 70% by weight, preferably from 40 to 60% by weight, based on the ready-to-apply coating material, of organic solvents, such as aliphatic, aromatic and/or cycloaliphatic hydrocarbons, alkyl esters of acetic acid or propionic acid, alkanols, ketones, glycol ethers and/or glycol ether esters, for example.

The coating material may further comprise at least one customary and known coatings additive in effective amounts, i.e., in amounts of preferably up to 40% by weight, with particular preference up to 30% by weight, and in particular up to 20% by weight, based in each case on the overall solids content of the coating material. It is essential that the coatings additives do not adversely affect the transparency and clarity of the coating material.

Examples of suitable coatings additives are
UV absorbers;
light stabilizers such as HALS compounds, benzotriazoles or oxalanilides;
free-radical scavengers;
crosslinking catalysts such as dibutyltin dilaurate or lithium decanoate;
slip additives;
polymerization inhibitors;
defoamers;
reactive diluents, such as are common knowledge from the prior art;
Examples of particularly suitable thermally curable reactive diluents are positionally isomeric diethyloctanediols or hydroxyl-containing hyperbranched compounds or dendrimers, as described in patent application DE 198 09 643 A1, DE 198 40 605 A1 or DE 198 05 421 A1.
Examples of particularly suitable reactive diluents curable with actinic radiation are described in Römpp Lexikon Lacke und Druckfarben, Georg Thieme Verlag, Stuttgart, New York, 1998, on page 491 under the entry heading "Reactive Diluents".
wetting agents such as siloxanes, fluorine compounds, carboxylic monoesters, phosphates, polyacrylic acids and their copolymers or polyurethanes;
adhesion promoters such as tricyclodecanedimethanol;
leveling agents;
film-forming auxiliaries such as cellulose derivatives;
further transparent fillers such as nanoparticles based on silica, alumina or zirconium oxide; for further details refer to Römpp Lexikon "Lacke und Druckfarben", Georg Thieme Verlag, Stuttgart, 1998, pages 250 to 252;
rheology control additives such as those known from patent WO 94/22968, EP-A-0 276 501, EP-A-0 249 201 or WO 97/12945; crosslinked polymeric microparticles, such as those disklosed, for example, in EP-A-0 008 127; inorganic phyllosilicates such as aluminum magnesium silicates, sodium magnesium phyllosilicates and sodium magnesium fluorine lithium phyllosilicates of the montmorillonite type; silicas such as Aerosils; or synthetic polymers containing ionic and/or associative groups such as polyvinyl alcohol, poly (meth)acrylamide, poly (meth) acrylic acid, polyvinylpyrrolidone, styrene-maleic anhydride or ethylene-maleic anhydride copolymers and their derivatives or hydrophobically modified ethoxylated urethanes or polyacrylates;
flame retardants and/or
flatting agents.

Further examples of suitable coatings additives are described in the textbook "Lackadditive" [Additives for coatings] by Johan Bieleman, Wiley-VCH, Weinheim, New York, 1998.

The crosslinking agent or mixture of crosslinking agents may be added at the same time or not until immediately before application of the coating material. In the case of two-component systems the crosslinking agent, nonblocked polyisocyanates for example, is not added until immediately before application of the coating material. In the case of one-component systems the crosslinking agent, blocked polyisocyanates for example, may already have been added by the manufacturer.

The preparation of the coating materials of the invention requires no special features in terms of method but instead takes place in accordance with the customary methods of preparing coating materials by mixing of their constituents and homogenization of the resulting mixtures in suitable mixing equipment such as stirred tanks, dissolvers, UltraTurrax, inline dissolvers, stirred mills, bead mills or extruders.

The nanoparticles (A) and (B) for use in accordance with the invention and also, where appropriate, the pigments are preferably mixed in the form of pastes with the other constituents.

Dispersion with binders may where appropriate take place in the presence of dispersants.

Suitable grinding resins include in principle all substances which have also been listed above already for the binders. Preferred grinding resins used are polyesters and/or polyacrylates, especially hydroxyl-containing polyacrylates.

The coating materials of the invention serve for producing the films, moldings, especially optical moldings, and coatings of the invention, especially coatings on primed or unprimed substrates.

Suitable substrates include all surfaces to be coated which are not damaged by curing of the coatings present thereon using heat or both heat and actinic radiation. Suitable substrates are composed, for example, of metals, plastics, wood, ceramic, stone, textile, fiber composites, leather, glass, glass fibers, glass wool, rock wool, mineral-bound and resin-bound building materials, such as plasterboard and cement slabs or roofing shingles, and also composites of these materials. The surfaces of these materials may already have been painted or coated.

Accordingly, the coating materials of the invention are especially suitable for the painting or coating of motor vehicle bodies and parts thereof, the interior and exterior of motor vehicles, the inside and outside of buildings, doors, windows, furniture, and also, in the context of industrial coating, for the coating of plastics parts, especially transparent plastics parts, small parts, coils, containers, packaging, electrical components, and white goods, and also for the coating of hollow glassware. In particular the coating materials of the invention are suitable for use in the automobile sector.

In the case of electrically conductive substrates it is possible to use primers, which are prepared customarily from electrocoat materials. Both anodic and cathodic electrocoat materials are suitable for these purposes, but especially cathodics.

With the coating of the invention it is also possible to coat primed or unprimed plastics such as, for example, ABS, AMMA, ASA, CA, CAB, EP, UF, CF, MF, MPF, PF, PAN, PA, PE, HDPE, LDPE, LLDPE, UHMWPE, PET, PMMA, PP, PS, SB, PUR, PVC, RF, SAN, PBT, PPE, POM, PUR-RIM, SMC, BMC, PP-EPDM and UP (abbreviated designations in accordance with DIN 7728T1) and also their polymer blends or the fiber-reinforced composite materials produced using these plastics.

Nonfunctionalized and/or apolar substrate surfaces may be subjected prior to coating in a known manner to a pretreatment, such as with a plasma or by flaming, or may be provided with a hydroprimer.

Particular advantages are displayed by the coating materials of the invention and the coatings of the invention in automotive OEM finishing and refinishing as clear and transparent, highly scratch-resistant, highly glossy, flexible, acid- and water-resistant, firmly adhering, stonechip-resistant clearcoats as part of multicoat color and/or effect paint systems.

The multicoat paint systems of the invention may be produced in a variety of ways. Preference is given to using the wet-on-wet techniques described in German patent application DE 199 30 664 A1 on page 15 lines 36 to 58.

Since the coatings of the invention produced from the coating materials of the invention exhibit outstanding adhesion even to ready-cured electrocoats, surfacer coats, basecoats or customary clearcoats, they are outstandingly suitable for automotive refinish or for the scratch-resistant finishing of exposed areas of painted automobile bodies.

The coating materials of the invention may be applied by any customary method, such as spraying, knife coating, brushing, flow coating, dipping, impregnating, trickling or rolling, for example. The substrate to be coated may itself be at rest, with the application unit or equipment being moved. Alternatively the substrate to be coated, in particular a coil, may be moved, with the application unit being at rest relative to the substrate or being moved appropriately.

Preference is given to employing spray application methods, such as compressed air spraying, airless spraying, high-speed rotation, electrostatic spray application (ESTA), alone or in conjunction with hot spray application such as, for example, hot air spraying.

Curing of the applied coating materials of the invention may take place after a certain rest time. This has a duration of from 30 s to 2 h, preferably from 1 min to 1 h and in particular from 1 min to 45 min. The rest time is used, for example, for leveling and devolatilization of the paint films or for the evaporation of volatile constituents such as solvents. The rest time may be assisted and/or shortened by the application of elevated temperatures up to 90° C. and/or a reduced air humidity <10 g of water/kg of air, in particular <5 g/kg of air, provided this is not accompanied by any damage to or change in the paint films, such as premature complete crosslinking.

The thermal cure has no special features in terms of method but is instead carried out in accordance with the customary methods such as heating in a forced air oven or irradiation using IR lamps. The thermal cure may also take place in stages. Another preferred curing method is curing with near infrared (NIR) radiation. Particular preference is given to employing a process in which the water constituent is removed rapidly from the wet films. Suitable processes of this kind are described, for example, by Rodger Talbert in Industrial Paint & Powder, 04/01, pages 30 to 33, "Curing in Seconds with NIR", or in Galvanotechnik, volume 90 (11), pages 3098 to 3100, "Lackiertechnik, NIR-Trocknung im Sekundentakt von Flüssig- und Pulverlacken".

Thermal cure takes place advantageously at a temperature of from 50 to 200° C., with particular preference from 60 to 190° C., and in particular from 80 to 180° C. for a time of from 1 min up to 2 h, with particular preference from 2 min up to 1 h, and in particular from 3 min to 45 min.

Furthermore, the actinic radiation cure is conducted using UV radiation and/or electron beams. In this case it is preferred to employ a dose of from 1 000 to 3 000, more preferably from 1 100 to 2 900, with particular preference from 1 200 to 2 800, with very particular preference from 1 300 to 2 700, and in particular from 1 400 to 2 600 mJ/cm$^2$. Where appropriate, this cure may be supplemented with actinic radiation from other radiation sources. In the case of electron beams it is preferred to operate under an inert gas atmosphere. This can be ensured, for example, by supplying carbon dioxide and/or nitrogen directly to the surface of the paint films. In the case of the cure with UV radiation as well it is possible to operate under inert gas or in an oxygen-depleted atmosphere in order to prevent the formation of ozone.

The actinic radiation cure is carried out using the customary radiation sources and optical auxiliary measures. Examples of suitable radiation sources are flashlights from the company VISIT, high or low pressure mercury vapor lamps, which may have been doped with lead in order to open up a radiation window up to 405 nm, or electron beam sources. The equipment and conditions for these curing methods are described, for example, in R. Holmes, U.V. and E.B. Curing Formulations for Printing Inks, Coatings and Paints, SITA Technology, Academic Press, London, United Kingdom 1984. Further examples of suitable processes and equipment for curing with actinic radiation are described in German patent application DE 198 18 735 A1, column 10 lines 31 to 61.

In the case of workpieces of complex shape, such as are envisaged for automobile bodies, those regions not accessible to direct radiation (shadow regions) such as cavities, folds and other structural undercuts may be cured (partially) using pointwise, small-area or all-round emitters in conjunction with an automatic movement means for the irradiation of cavities or edges.

Curing here may take place in stages, i.e., by multiple exposure to light or actinic radiation. It may also take place alternately, i.e., by curing alternately with UV radiation and electron beams.

Where the thermal cure and actinic radiation cure are employed together, these methods may be used simultaneously or alternately. Where the two cure methods are used alternately, it is possible for example to begin with the thermal cure and to end with the actinic radiation cure. In other cases it may prove advantageous to begin and to end with the actinic radiation cure.

The multicoat paint systems of the invention have an outstanding profile of properties which is very well balanced in terms of mechanics, optics, corrosion resistance, and adhesion. Accordingly, the multicoat paint systems of the invention have the high optical quality and intercoat adhesion the market requires and do not give rise to any problems such as deficient condensation resistance, mudcracking or leveling defects or surface structures in the clearcoats of the invention.

Nonaqueous coating materials may contain, for example, from 20 to 70% by weight, preferably from 40 to 60% by weight (based on the ready-to-apply coating material), of organic solvents, such as aliphatic, aromatic and/or cycloaliphatic hydrocarbons, alkyl esters of acetic acid or propionic acid, alkanols, ketones, glycol ethers and/or glycol ether esters, for example.

In particular the multicoat paint systems of the invention have an outstanding metallic effect, an outstanding D.O.I. (distinctiveness of the reflected image), an especially high scratch resistance, and an outstanding surface smoothness.

Accordingly, the primed or unprimed substrates of the invention coated with at least one coating of the invention combine a particularly advantageous profile of performance properties with a particularly long service life, which makes them particularly valuable economically, esthetically, and technically.

INVENTIVE AND COMPARATIVE EXAMPLES

The Preparation of a Polyacrylate 1 (Binder)

A laboratory reactor with a useful capacity of 4 l, equipped with a stirrer, two dropping funnels for the monomer mixture and initiator solution respectively, a nitrogen inlet tube, thermometer, and reflux condenser was charged with 897 g of an aromatic hydrocarbon fraction having a boiling range of 158–172° C. The solvent was heated to 140° C. After it had reached 140° C., a monomer mixture of 487 g of t-butyl acrylate, 215 g of n-butyl methacrylate, 143 g of styrene, 572 g of hydroxypropyl methacrylate and 14 g of acrylic acid was metered into the reactor at a uniform rate over the course of 4 h and an initiator solution of 86 g of t-butyl perethylhexanoate in 86 g of the aromatic solvent described was metered into the reactor at a uniform rate over the course of 4.5 hours. The metered additions of the monomer mixture and of the initiator solution were commenced simultaneously. After the end of the metered addition of initiator, the reaction mixture was held at 140° C. for 2 h and then cooled. The resulting polymer solution, diluted with a mixture of 1-methoxypropyl 2-acetate, butyl glycol acetate and butyl acetate, had a solids content of 53%, determined in a forced air oven at 130° C. over 1 h, an acid number of 10, an OH number of 156, and a viscosity of 23 dPas (measured on a 60% dilution of the polymer solution in the aromatic solvent described, using an ICI cone-and-plate viscometer at 23° C.).

The Preparation of a Polyacrylate 2 (Binder)

A suitable reactor, equipped with a stirrer, two dropping funnels for the monomer mixture and initiator solution respectively, a nitrogen inlet tube, thermometer, heating, and reflux condenser, was charged with 650 parts by weight of an aromatic hydrocarbon fraction having a boiling range of 158–172° C. The solvent was heated to 140° C. After it had reached 140° C., a monomer mixture of 652 parts by weight of ethylhexyl acrylate, 383 parts by weight of 2-hydroxyethyl methacrylate, 143 parts by weight of styrene, 212 parts by weight of 4-hydroxybutyl acrylate and 21 parts by weight of acrylic acid was metered into the reactor at a uniform rate over the course of 4 h and an initiator solution of 113 parts by weight of t-butylperethylhexanoate in 113 parts by weight of the aromatic solvent was metered into the reactor at a uniform rate over the course of 4.5 hours. The metered additions of the monomer mixture and of the initiator solution were commenced simultaneously. After the end of the metered addition of initiator, the resulting reaction mixture was heated at 140° C. for a further 2 h with stirring and then cooled. The resulting solution of the methacrylate copolymer was diluted with a mixture of 1-methoxypropyl 2-acetate, butyl glycol acetate and butyl acetate.

The resulting solution had a solids content of 65%, determined in a forced air oven at 130° C. over 1 h, an acid number of 15 mg KOH/g solids, an OH number of 175 mg KOH/g solids, and a glass transition temperature of −21° C.

The Preparation of a Polyacrylate 3 (Binder)

A laboratory reactor with a useful capacity of 4 l, equipped with a stirrer, two dropping funnels for the monomer mixture and initiator solution respectively, a nitrogen inlet tube, thermometer, and reflux condenser, was charged with 720 g of an aromatic hydrocarbon fraction having a boiling range of 158–172° C. The solvent was heated to 140° C. After it had reached 140° C., a monomer mixture of 212 g of n-butyl methacrylate, 367 g of cyclohexane methacrylate, 282 g of styrene, 254 g of hydroxyethyl methacrylate, 282 g of hydroxypropyl methacrylate and 14 g of acrylic acid was metered into the reactor at a uniform rate over the course of 4 h and an initiator solution of 141 g of t-butylperethylhexanoate in 90 g of the aromatic solvent described was metered into the reactor at a uniform rate over the course of 4.5 hours. The metered additions of the monomer mixture and of the initiator solution were commenced simultaneously. After the end of the metered addition of initiator, the reaction mixture was held at 140° C. for a further 2 h and then cooled. The resulting polymer solution had a solids content of 60%, determined in a forced air oven at 130° C. over 1 h, an acid number of 10, an OH number of 155, and a viscosity of 18.5 dPas (measured on a 55% dilution of the polymer solution in the aromatic solvent described, using an ICI cone-and-plate viscometer at 23° C.).

The Preparation of a Paste of Hydrophilic Nanoparticles (A)

A stirred laboratory mill from Vollrath was charged with 800 g of a millbase composed of 592 g of polyacrylate 1, 80 g of butyl acetate, 64 g of xylene and 64 g of Aerosil® 972 (Degussa AG, Hanau, BET surface area=110±20 $m^2/g$) together with 1 100 g of quartz sand (grain size 0.7–1 mm) and this mixture was dispersed for 30 minutes with water cooling. The grinding media were subsequently separated off.

The Preparation of a Paste of Hydrophilic Nanoparticles (B)

A stirred laboratory mill from Vollrath was charged with 800 g of a millbase composed of 600 g of polyacrylate 3, 130.4 g of butyl acetate and 69.6 g of Aerosil® R 380 (Degussa AG, Hanau, BET surface area 380±30 $m^2/g$) together with 1 100 g of quartz sand (grain size 0.7–1 mm) and this mixture was dispersed for 30 minutes with water cooling. The grinding media were subsequently separated off.

Example 1 (Inventive) and Examples C1 and C2 (Comparative)

The Preparation of an Inventive Two-Component Clearcoat Material (Example 1) and of Noninventive Two-Component Clearcoat Materials (Examples C1 and C2)

An inventive two-component clearcoat material (example 1) and two conventional two-component clearcoat materials (examples C1 and C2) were prepared from the constituents listed in table 1 by mixing and homogenizing and were applied to test panels.

TABLE 1

Composition of the inventive two-component clearcoat material (example 1) and of the conventional two-component clearcoat materials (examples C1 and C2)

| Ingredients | Examples | | |
|---|---|---|---|
| | 1 | C1 | C2 |
| | (parts by weight) | | |
| Varnish | | | |
| Polyacrylate 2 | 35.0 | 35.0 | 35.0 |
| Polyacrylate 3 | 18.0 | 14.0 | 23.0 |
| Setalux ® 81198 (Akzo Nobel Resins, Bergen op Zoom) | 10.0 | 10.0 | 10.0 |
| Disperbyk 161 (Byk Chemie, Wesel) | 1.0 | 1.0 | 1.0 |
| Nanoparticles | | | |
| Nanoparticle paste (A) | 8.3 | — | 8.3 |
| Nanoparticle paste (B) | 9.7 | 20.0 | — |
| Substit. hydroxyphenylbenzotriazole 95% in xylene) | 1.2 | 1.2 | 1.2 |
| Aminoether-modified 2,2,6,6-tetra-methylpiperidyl ester | 1.0 | 1.0 | 1.0 |
| Byk ® 390 (Byk Chemie) | 0.2 | 0.2 | 0.2 |
| Byk ® 325 (Byk Chemie) | 0.2 | 0.2 | 0.2 |
| Byk ® ES80 | 0.2 | 0.2 | 0.2 |
| Butanol | 1.5 | 1.5 | 1.5 |
| Butyl diglycol acetate | 5.0 | 5.0 | 5.0 |
| Butyl acetate | 3.7 | 5.7 | 8.4 |
| Ethoxypropyl acetate | 5.0 | 5.0 | 5.0 |
| | 100 | 100 | 100 |
| Crosslinker | 33 | 33 | 33 |
| Dilution of a polyisocyanate based on hexamethylene diisocyanate (80% dilution of Desmodur N 3390 from Bayer AG in butyl acetate/solvent n aphtha) | | | |

Setalux ® 81198 is a urea derivative in solution or dispersion with a binder.

The amounts are in each case based on the solids content.

To produce the test panels, an electrocoat material and a water-based surfacer were applied with a film thickness of 18–22 μm and 35–40 μm respectively, and baked. The electrocoat material was baked at 170° C. for 20 min and the surfacer at 160° C. for 20 min. Then a black aqueous basecoat material was applied with a film thickness of 12–15 μm and was flashed off at 80° C. for 10 min. Finally, the clearcoat materials were applied vertically in a single electrostatic application (bell type: Ecobell), after which the basecoat and the clearcoats were cured at 140° C. for 20 min (wet-on-wet technique). This gave clearcoats with a film thickness of 55 μm.

Description of the Rotarub Test for Determining the Scratch Resistance

The scratching of the test panels is produced by a two-dimensional movement and additional rotation of the test element.

The test panels have a size of 500×200 mm, corresponding to that of the sample accommodation platform.

The travel path can be selected arbitrarily by way of the coordinates of the x and y axes, with an x-axis advance rate of up to 70 mm/s and a y-axis advance rate of 20 mm/s.

The test conditions can be modified by means of a freely selectable workpiece zero point and an advancing movement of the test element that can be adjusted in terms of speed and number of cycles.

Moreover, the rotational speed of the disk can be chosen steplessly up to 500 rpm, and the pressure applied to the test element can be altered by way of the weight force of the particular brush pot used.

A hotplate serving as sample accommodation platform can be heated to up to 80° C. by means of an external thermal conditioning device.

The receiver for the test element is a circular plastic disk, referred to as the brush pot, having a diameter of 70 mm.

The brush pot itself represents one of the parameters of the experiments, by virtue of its inherent weight.

The test element (the friction material) is fastened by its foam side on the brush pot, using a touch-and-close fastening.

The test element is composed of paper of grade AGFA 701 and causes the pattern of damage by virtue of the fraction of abrasive ingredients.

The test element is constructed from a Moltopren foam board 4 mm thick to which the AGFA 701-grade paper is fastened using double-sided adhesive tape.

A circular ring measuring 70×40 mm is used as test element.

Accordingly, the circular area of the center, with a diameter of 30 mm, is cut out.

Parameters of the rotarub test for the inventive clearcoat material and the comparative coating material: weight of the complete test disk: 304.8 g, speed in x direction 45.3 mm/s, speed in y direction 20 mm/s, rotation of the test disk 2.4 rotations/s, measurement temperature 23.0° C., rel. atmospheric humidity 53%. The y-axis displacement of the meandering movement over the metal test panel was 3.67 mm. The number of meanders was 26 (i.e., 26 times x+y travel).

After scratching, the residual DIN gloss 20° was measured for the purpose of assessing the damage.

RESULTS

The metal test panels with the clearcoats over black aqueous basecoat were tested using the rotarub test described above.

The clearcoat material of example C1 with the hydrophilic particles showed a loss of gloss of 20.3 units (DIN 20° geometry), that of example C2 with the hydrophobic particles a loss of 5.2 units, and the inventive clearcoat material a loss of gloss of 8.2 units.

The clearcoat material of example C2 showed lack of transparency, especially at coat thicknesses above 50 μm, as are required in practice. Both the clearcoat material of example C1 and the inventive clearcoat material showed excellent transparency even at high coat thicknesses of more than 50 μm to 60 μm.

The table describes the leveling properties of the clearcoat materials.

TABLE 2

Leveling properties and DOI of the inventive clearcoat material from example 1 and of the conventional clearcoat materials from examples C1 and C2

| | Examples | | |
|---|---|---|---|
| | 1 | C1 hydrophilic 380 | C2 hydrophobic 972 |
| Leveling (visual) | Smooth surface (flat grain) | Smooth surface (flat grain) | Wavier surface (pronounced grain) |
| Leveling (instrumental) Wavescan[a]: | | | |
| longwave horizontal | 8.9 | 6.1 | 10.1 |
| shortwave horizontal | 28.6 | 24.5 | 29.5 |
| longwave vertical | 10.1 | 9.1 | 12.2 |
| shortwave vertical | 24.0 | 23.0 | 28.0 |
| DOI | 91 | 96 | 82 |

[a]Instrument: Byk/Gardner - Wave scan plus

The results underline the fact that only the clearcoat material of example 1 with the inventive combination of hydrophilic and hydrophobic nanoparticles gave smooth, brilliant, clear, and scratch-resistant clearcoats having a very good leveling and free from surface structures.

What is claimed is:

1. A coating material comprising
   (A) at least one hydrophobic nanoparticles based on silica and
   (B) at least one hydrophilic nanoparticles based on silica having a BET internal surface area of >300 m$^2$/g,
wherein the coating material comprises the nanoparticles (A) and (B) in an amount of from 0.8 to 3% by weight, based on the overall solids content of the coating material.

2. The coating material of claim 1, wherein the hydrophilic nanoparticles (B) have a BET internal surface area of >340 m$^2$/g.

3. The coating material of claim 1, wherein the weight ratio of hydrophobic nanoparticles (A) to hydrophluc nanoparticles (B) is from 1:4 to 4:1.

4. The coating material of claim 3, wherein the (A):(B) weight ratio is from 3:7 to 7:3.

5. The coating material of claim 4, wherein the (A):(B) weight ratio is from 2:3 to 3:2.

6. The coating material of claim 1 wherein the primary particle size of the nanoparticles (A) and (B) is <35 nm.

7. The coating material of claim 6, wherein the primary particle size is <20 nm.

8. The coating material of claim 7, wherein the primary particle size is <10 nm.

9. The coating material of claim 1, wherein the hydrophobic nanoparticles (A) are obtained by surface modification of pyrogenic silica.

10. The coating material of claim 1, wherein the hydrophilic nanoparticles (B) comprise pyrogenic silica.

11. The coating material as claimed in claim 1, comprising the nanoparticies (A) and (B) in an amount of from 1 to 2.4% by weight, based on the overall solids content of the coating material.

12. A process for preparing the coating material of claim 1 comprising mixing and homogenizing the hydrophobic nanoparticles (A) and the hydrophilic nanoparticles (B) in the form of pigment pastes with the other constituents.

13. A process for preparing a scratch-resistant coated surface, comprising applying the coating material of claim 1 to a surface.

14. The process of claim 13 wherein the coating material of claim 1 is in the form of a molding or a film.

15. The process of claim 13 wherein the coating material is at least one component of an automotive multicoat paint system.

* * * * *